United States Patent
Kim et al.

(10) Patent No.: US 9,882,590 B2
(45) Date of Patent: Jan. 30, 2018

(54) METHOD AND APPARATUS FOR CANCELLING INTERFERENCE AND RECEIVING SIGNAL IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Joonkui Ahn, Seoul (KR); Byounghoon Kim, Seoul (KR); Hanjun Park, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/129,383

(22) PCT Filed: May 18, 2015

(86) PCT No.: PCT/KR2015/004952
§ 371 (c)(1),
(2) Date: Sep. 26, 2016

(87) PCT Pub. No.: WO2015/174801
PCT Pub. Date: Nov. 19, 2015

(65) Prior Publication Data
US 2017/0179985 A1    Jun. 22, 2017

Related U.S. Application Data

(60) Provisional application No. 61/994,132, filed on May 16, 2014, provisional application No. 62/039,925, filed on Aug. 21, 2014.

(51) Int. Cl.
*H04B 1/00* (2006.01)
*H04B 1/10* (2006.01)
(Continued)

(52) U.S. Cl.
CPC ............... *H04B 1/10* (2013.01); *H04W 8/24* (2013.01)

(58) Field of Classification Search
CPC ..... H04L 5/0007; H04L 5/005; H04L 5/0073; H04W 8/005
(Continued)

(56) References Cited

U.S. PATENT DOCUMENTS

2013/0343301 A1* 12/2013 Geirhofer ............... H04L 5/001
370/329
2014/0092825 A1   4/2014 Bostrom et al.
(Continued)

FOREIGN PATENT DOCUMENTS

WO   2014053487   4/2014
WO   2014058222   4/2014
(Continued)

OTHER PUBLICATIONS

PCT International Application No. PCT/KR2015/004952, Written Opinion of the International Searching Authority dated Aug. 20, 2015, 18 pages.
(Continued)

*Primary Examiner* — Lee Nguyen
(74) *Attorney, Agent, or Firm* — Lee Hong Degerman Kang Waimey

(57) ABSTRACT

The present invention relates to a wireless communication system. A method for a terminal for receiving a signal by means of NAICS (Network-Assisted Interference Cancellation and Suppression) in a wireless communication system that supports carrier aggregation according to one embodiment of the preset invention comprises the steps of: transmitting terminal capability information comprising band combination information indicating the band combination supported by the terminal on the carrier aggregation; and
(Continued)

receiving a signal on the basis of the terminal capability information, wherein the band combination information may comprise directive information indicating whether the UE support the NAICS for the band combination.

12 Claims, 13 Drawing Sheets

(51) Int. Cl.
  *H04W 8/24* (2009.01)
  *H04B 7/00* (2006.01)
(58) Field of Classification Search
  USPC .................................................... 455/63.1
  See application file for complete search history.

(56) References Cited

U.S. PATENT DOCUMENTS

2016/0080094 A1    3/2016  Kim et al.
2016/0226600 A1*   8/2016  Ellenbeck ............. H04W 48/16

FOREIGN PATENT DOCUMENTS

WO    2015088688    6/2015
WO    2015195210    12/2015

OTHER PUBLICATIONS

Ericsson et al., "Support of bandwidth combination for intra-band CA and the UE capability", R4-121701, 3GPP TSG RAN WG4 Meeting #62bis, Mar. 19, 2012, 8 pages.
Ericsson, "NAICS functionality, robustness, and configurability", R1-142322, 3GPP TSG RAN WG1 Meeting #77, May 10, 2014, 5 pages.
Qualcomm Incorporated, "CSI Measurement and Reporting for NAICS", R1-141458, 3GPP TSG RAN WG1 Meeting #76bis, Mar. 22, 2014, 5 pages.
European Patent Office Application Serial No. 15793209.6, Search Report dated Oct. 30, 2017, 11 pages.
Ericsson, "RAN 4 scope for NAICS work", 3GPP TSG RAN WG4 Meeting #71, R4-142734, May 2014, 7 pages.
Nvidia, "NAICS UE capabilities", 3GPP TSG RAN WG4 Meeting #73, R4-147340, Nov. 2014, 4 pages.
Mediatek, "LS on Rel-12 NAICS CA Capability", 3GPP TSG RAN2 Meeting #88, R2-145331, Nov. 2014, 2 pages.
RAN WG4, "LS on Rel-12 NAICS CA AP Capability-Clarification", 3GPP TSG RAN WG2 Meeting #88, R2-145348, Nov. 2014, 2 pages.

* cited by examiner

FIG. 5
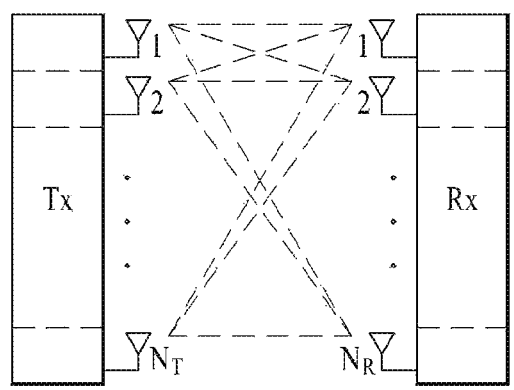
(a)
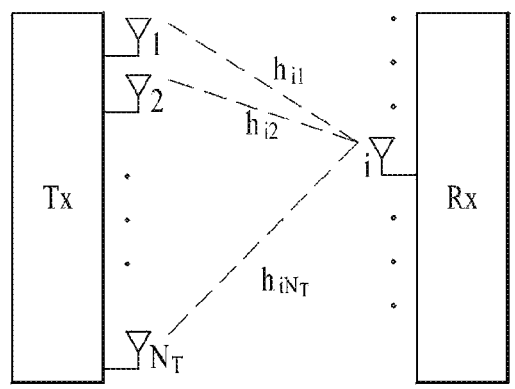
(b)

METHOD AND APPARATUS FOR CANCELLING INTERFERENCE AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/004952, filed on May 18, 2015, which claims the benefit of U.S. Provisional Application No. 61/994,132, filed on May 16, 2014, and 62/039,925, filed on Aug. 21, 2014, the contents of which are all hereby incorporated by reference herein in their entirety.

TECHNICAL FIELD

The present invention relates to a wireless communication system, and more particularly, to a method and apparatus for receiving a signal by cancelling interference in a wireless communication system.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more user equipments (UEs).

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all UEs in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE

Technical Problem

An object of the present invention is to provide a method and apparatus for receiving a signal by cancelling interference in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for receiving a signal using NAICS (Network-Assisted Interference Cancellation and Suppression) by a user equipment (UE) in a wireless communication system supporting a carrier aggregation may include transmitting UE capability information including band combination information indicating a band combination supported by the UE on the carrier aggregation, and receiving the signal based on the UE capability information. The band combination information may include indication information indicating whether the UE support the NAICS for the band combination.

If the indication information is included in the band combination information, it may be indicated that the UE supports NAICS.

The indication information may include a maximum number of component carriers (CCs) supporting NAICS in the band combination corresponding to the band combination information.

The indication information may include a maximum bandwidth supporting NAICS for the band combination corresponding to the band combination information.

The indication information may be configured in a bit-map, and each bit of the bitmap corresponds to a combination of a maximum number of component carriers (CCs) and a maximum bandwidth.

If the indication information is included in the band combination information, the number of common reference signal (CRS) ports in an interference cell may be determined to be 2.

In another aspect of the present invention, a UE for receiving a signal using NAICS in a wireless communication system supporting a carrier aggregation may include a radio frequency (RF) unit, and a processor. The processor may transmit UE capability information including band combination information indicating a band combination supported by the UE on the carrier aggregation, and receive the signal based on the UE capability information. The band combination information may include indication information indicating whether the UE support the NAICS for the band combination.

If the indication information is included in the band combination information, it may be indicated that the UE supports NAICS.

The indication information may include a maximum number of component carriers (CCs) supporting NAICS in the band combination corresponding to the band combination information.

The indication information may include a maximum bandwidth supporting NAICS for the band combination corresponding to the band combination information.

The indication information may be configured in a bitmap, and each bit of the bitmap corresponds to a combination of a maximum number of component carriers (CCs) and a maximum bandwidth.

If the indication information is included in the band combination information, the number of common reference signal (CRS) ports in an interference cell may be determined to be 2.

Advantageous Effects

According to an embodiment of the present invention, a method and apparatus for receiving a signal by cancelling interference in a wireless communication system can be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 illustrates the configuration of a multiple input multiple output (MIMO) communication system having multiple antennas;

BEST MODE

Figure 1:
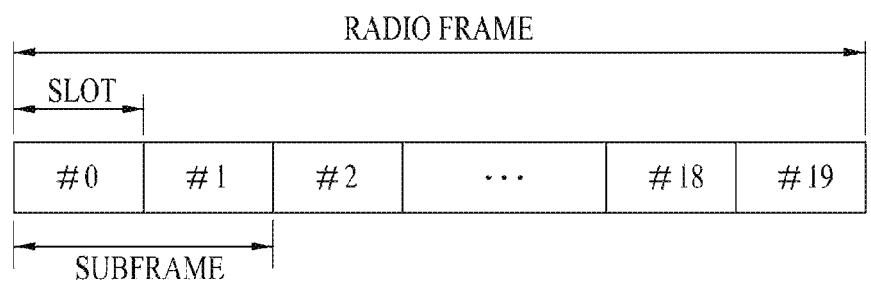
FIG. 1 illustrates the type-1 radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
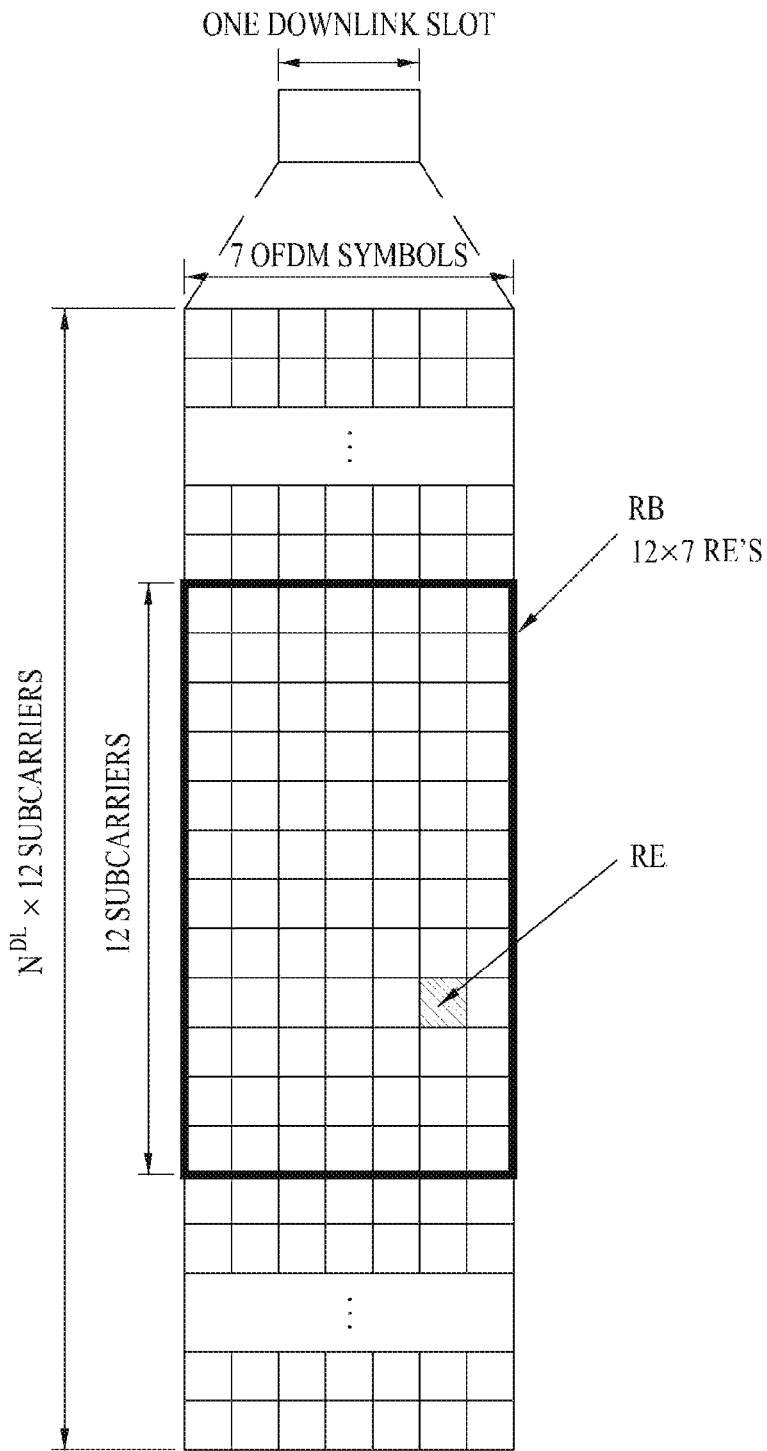
FIG. 2 illustrates the structure of a downlink resource grid for the duration of one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
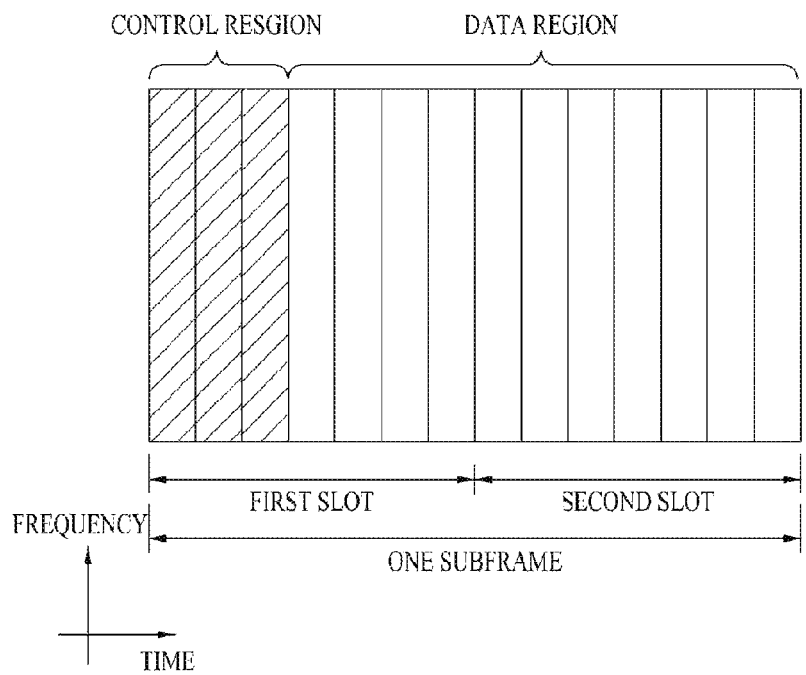
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information on a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
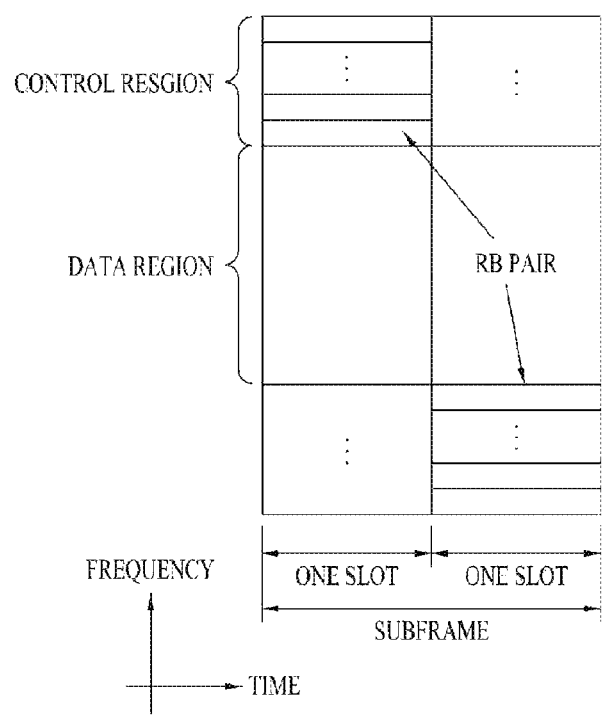
FIG. 4 illustrates the structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y=[y_1, y_2, \ldots, y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T=[h_{i1}, h_{i2}, \ldots, h_{iN_T}] \qquad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Equation 8]}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n=[n_1, n_2, \ldots, n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
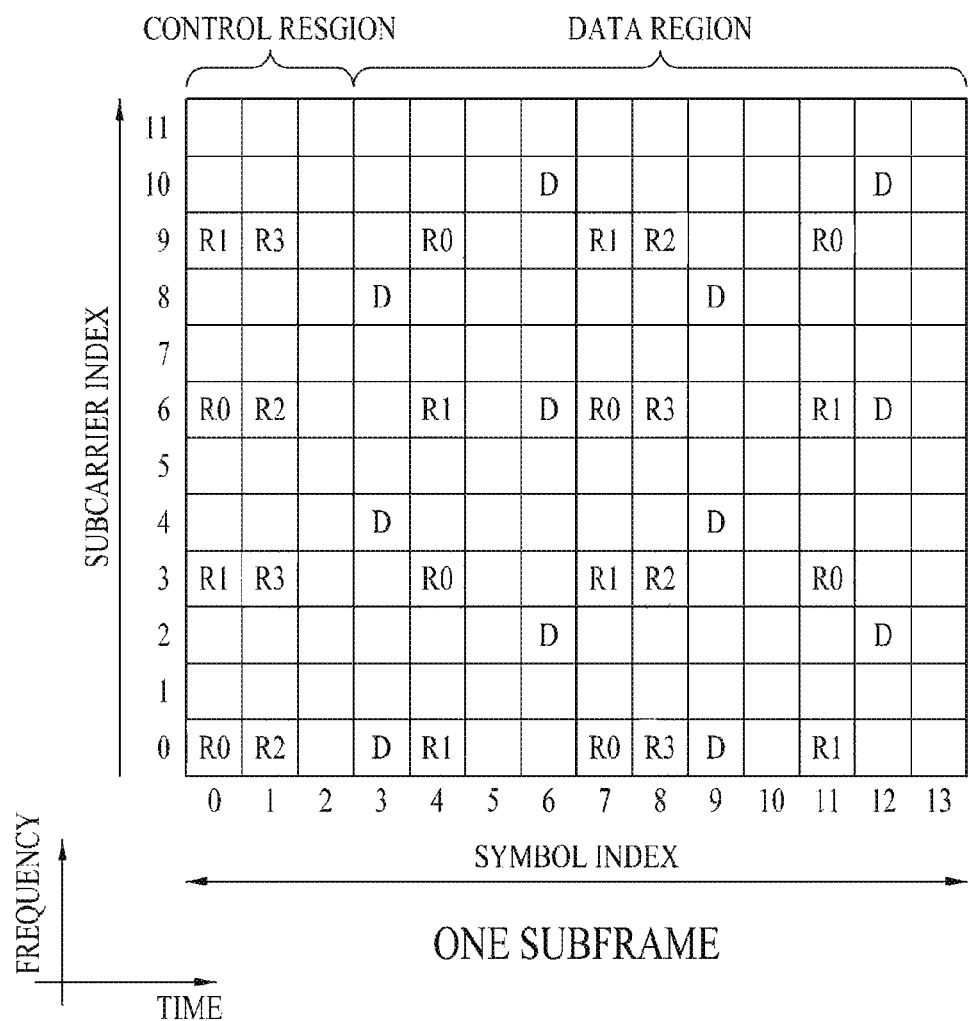
FIG. 6 illustrates a conventional common reference signal (CRS) and dedicated reference signal (DRS) pattern.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
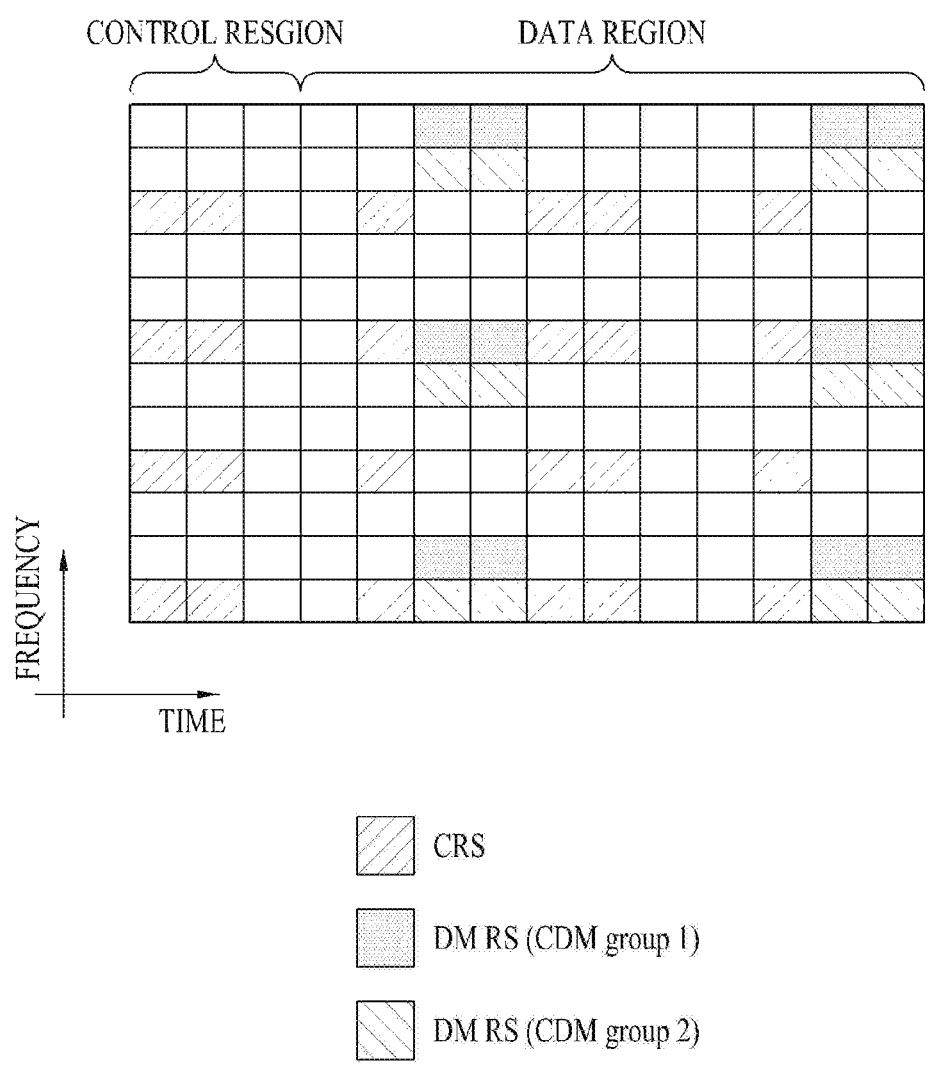
FIG. 7 illustrates an exemplary demodulation reference signal (DM RS) pattern defined for the long term evolution-advanced (LTE-A) system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
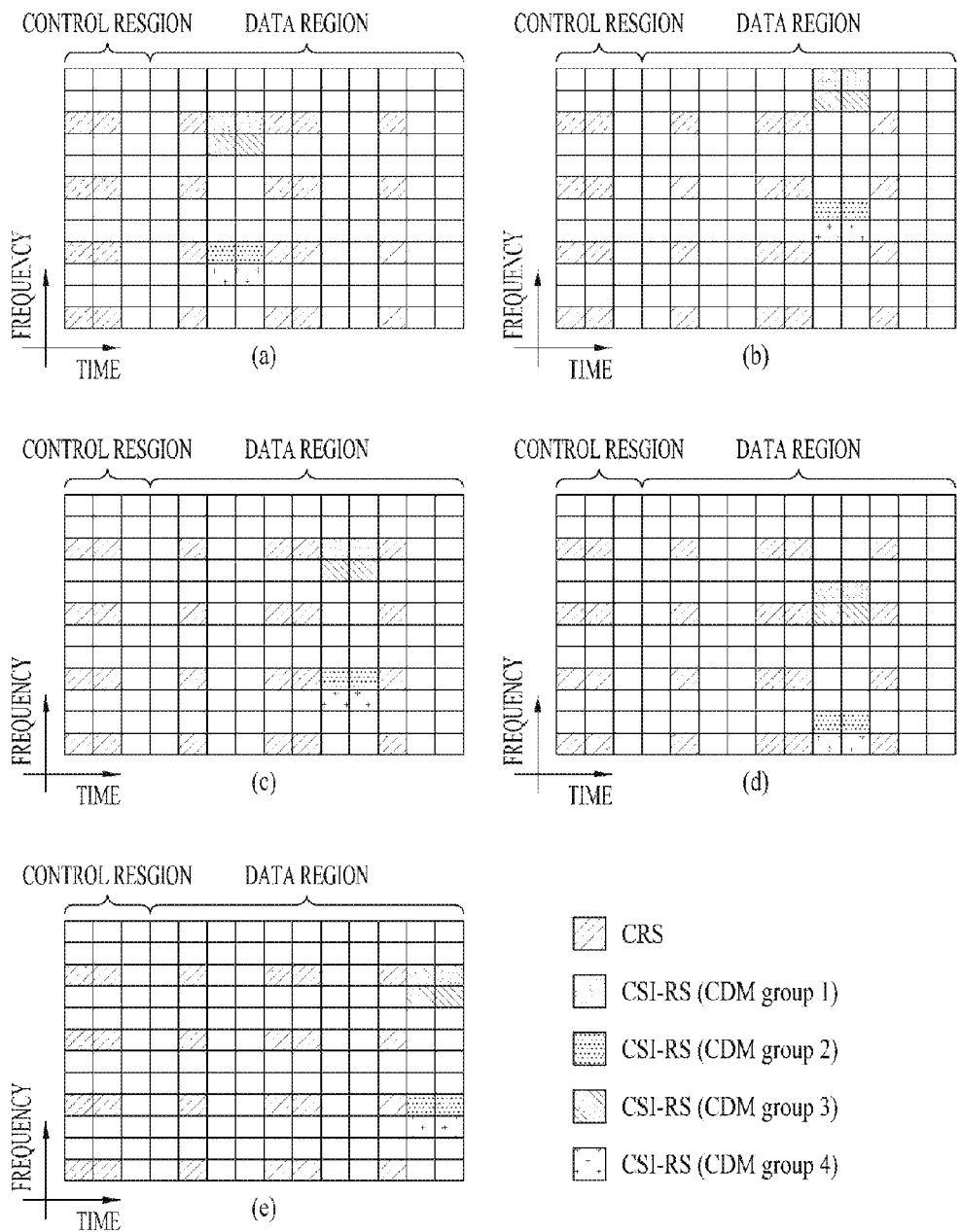
FIG. 8 illustrates exemplary channel state information reference signal (CSI-RS) patterns.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|-----|-------|-------|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
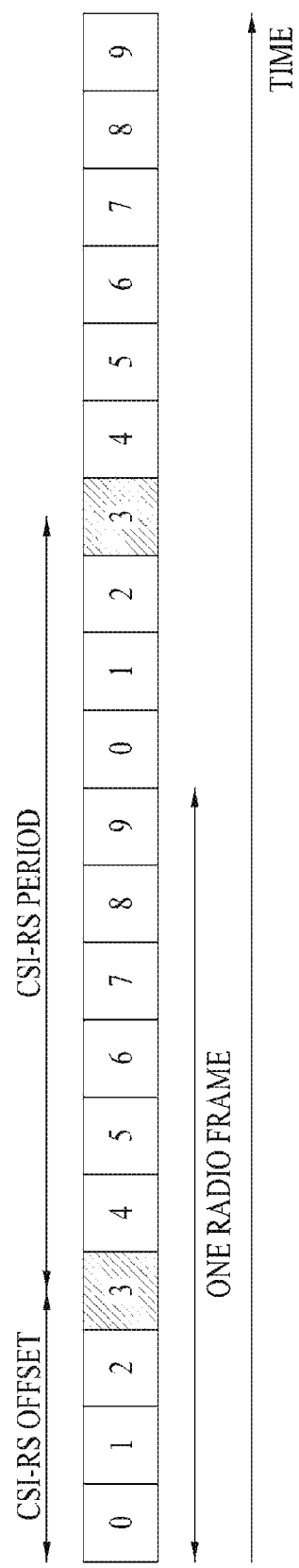
FIG. 9 illustrates an exemplary periodic CSI-RS transmission.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present invention, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
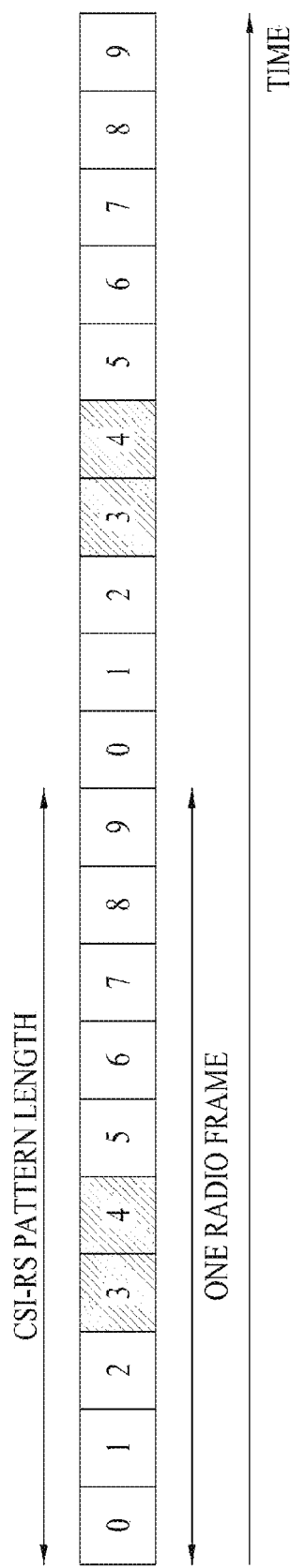
FIG. 10 illustrates an exemplary aperiodic CSI-RS transmission.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when contents on system information are informed to UEs, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This sort of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since information transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
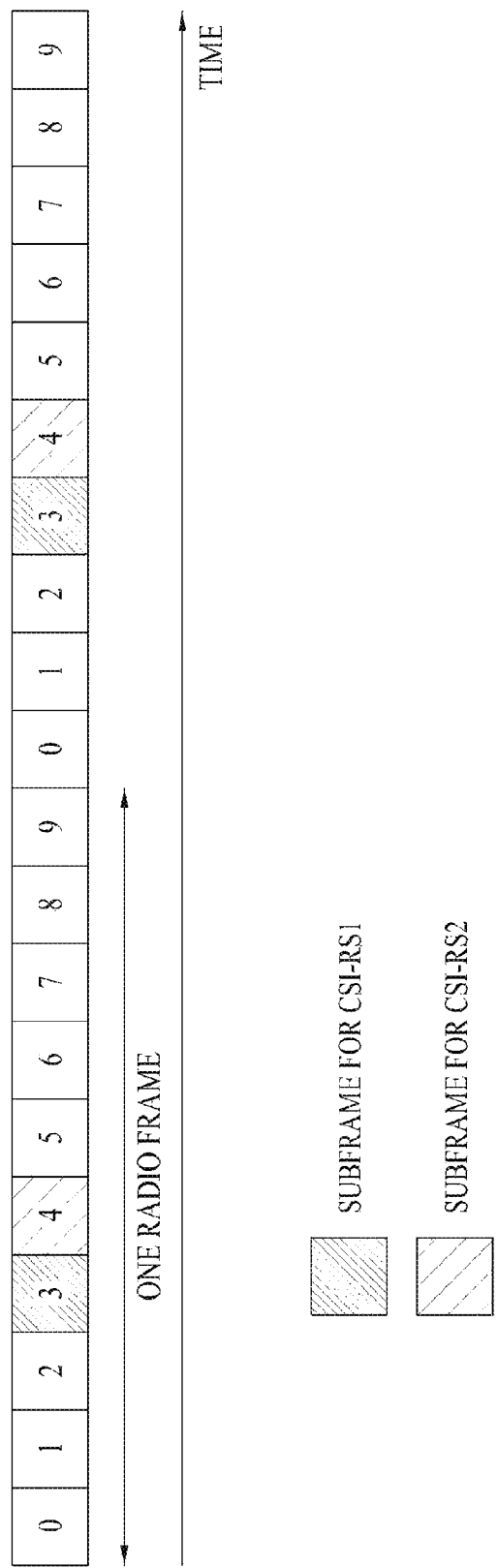
FIG. 11 illustrates an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by an SRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (*a*) and a CSI-RS according to another CSI-RS configuration is designated to be transmitted in an RE position shown in FIG. 8 (*b*)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

UE Capability Information Element

An LTE system, for example, an LTE-release 10 system may use mainly carrier aggregation (CA) and higher-layer MIMO in order to increase performance. A UE supporting this system may support CA and MIMO spatial division multiple access (MIMO SDMA). Such UEs may be classified into UEs having a high level capability and UEs having a low level capability depending on how much they support CA and MIMO SDMA. To transmit information about a capability that a UE has to a BS, a UE capability information element including various fields such as UE category may be used.

For example, the UE capability information element may include a supported MIMO-capability field. The supported MIMO-capability field includes information about the number of layers supported for spatial multiplexing on DL. A different MIMO capability may be configured per bandwidth, per band, or per band combination by the use of the supported MIMO-capability field.

The UE capability information element may further include the UE category field. The UE category field may define a UL capability and a DL capability for each of UEs under category 1 to category 8. Specifically, the UE category field may include a UL physical parameter value and a DL physical parameter value for a UE of each category. Even though UEs of categories 6, 7, and 8 do not support CA, they may include an rf-parameters field in the UE capability information element.

Carrier Aggregation (CA)

CA refers to assignment of a plurality of carriers to a UE. A component carrier (CC) is a carrier used in a CA system and may be referred to shortly as a carrier. For example, two 20-MHz CCs may be allocated to assign a 40-MHz bandwidth.

CA may be classified into inter-band CA and intra-band CA.

In inter-band CA, CCs of different bands are aggregated, whereas in intra-band CA, CCs of the same frequency band are aggregated.

Intra-band CA is further branched into intra-band contiguous CA and intra-band non-contiguous CA depending on whether aggregated CCs are contiguous.

Meanwhile, the following operating bands are defined for UL and DL in the 3GPP LTE/LTE-A system.

TABLE 3

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD[2] |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

In [Table 3], $F_{UL\_low}$ represents the lowest frequency of a UL operating band, and $F_{UL\_high}$ represents the highest frequency of the UL operating band. $F_{DL\_low}$ represents the lowest frequency of a DL operating band, and $F_{DL\_high}$ represents the highest frequency of the DL operating band.

If operating bands are set as listed in [Table 3], the frequency distribution organization of each country may assign a specific frequency to a service provider according to its situation.

Meanwhile, CA bandwidth classes and their corresponding guard bands are given as follows.

TABLE 4

| CA Bandwidth Class | Aggregated Transmission Bandwidth Configuration | Maximum number of CC | Nominal Guard Band $BW_{GB}$ |
|---|---|---|---|
| A | $N_{RB,agg} \leq 100$ | 1 | 0.05 $BW_{Channel(1)}$ |
| B | $N_{RB,agg} \leq 100$ | 2 | FFS |
| C | $100 < N_{RB,agg} \leq 200$ | 2 | 0.05 max ($BW_{Channel(1)}$, $BW_{Channel(2)}$) |
| D | $200 < N_{RB,agg} \leq [300]$ | FFS | FFS |
| E | $[300] < N_{RB,agg} \leq [400]$ | FFS | FFS |
| F | $[400] < N_{RB,agg} \leq [500]$ | FFS | FFS |

In [Table 4], [ ] represents that a numeral value is variable, FFS is short for For Further Study, and $N_{RB\_agg}$ represents the number of RBs aggregated in an aggregated channel band.

The following table lists an example of CA Configurations and their corresponding bandwidth sets, in the case of intra-band contiguous CA.

TABLE 5

E-UTRA CA configuration/Bandwidth combination set

| E-UTRA CA Configuration | 50RB + 100RB (10 MHz + 20 MHz) | 75RB + 75RB (15 MHz + 15 MHz) | 75RB + 100RB (15 MHz + 20 MHz) | 100RB + 100RB (20 MHz + 20 MHz) | Maximum aggregated bandwidth [MHz] | Bandwidth Combination Set |
|---|---|---|---|---|---|---|
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In [Table 5], CA Configuration represents an operating band and a CA bandwidth class. For example, CA_1C indicates Operating Band 1 in [Table 3] and CA Bandwidth Class C in [Table 4].

[Table 6] below lists an example of CA Configurations and their corresponding bandwidth sets, in the case of inter-band CA.

TABLE 6

E-UTRA CA configuration/Bandwidth combination set

| E-UTRA CA Configuration | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|
| CA_1A-5A | 1 |  |  |  | Yes |  |  | 20 | 0 |
|  | 5 |  |  |  | Yes |  |  |  |  |
| CA_1A-18A | 1 |  |  | Yes | Yes | Yes | Yes | 35 | 0 |
|  | 18 |  |  | Yes | Yes | Yes |  |  |  |
| CA_1A-19A | 1 |  |  | Yes | Yes | Yes | Yes | 35 | 0 |
|  | 19 |  |  | Yes | Yes | Yes |  |  |  |
| CA_1A-21A | 1 |  |  | Yes | Yes | Yes | Yes | 35 | 0 |
|  | 21 |  |  | Yes | Yes | Yes |  |  |  |
| CA_2A-17A | 2 |  |  | Yes | Yes |  |  | 20 | 0 |
|  | 17 |  |  | Yes | Yes |  |  |  |  |
| CA_2A-29A | 2 |  |  | Yes | Yes |  |  | 20 | 0 |
|  | 29 |  | Yes | Yes | Yes |  |  |  |  |
| CA_3A-5A | 3 |  |  |  | Yes | Yes | Yes | 30 | 0 |
|  | 5 |  |  | Yes | Yes |  |  |  |  |
|  | 3 |  |  |  | Yes |  |  | 20 | 1 |
|  | 5 |  |  | Yes | Yes |  |  |  |  |
| CA_3A-7A | 3 |  |  | Yes | Yes | Yes | Yes | 40 | 0 |
|  | 7 |  |  |  | Yes | Yes | Yes |  |  |
| CA_3A-8A | 3 |  |  |  | Yes | Yes | Yes | 30 | 0 |
|  | 8 |  |  | Yes | Yes |  |  |  |  |
|  | 3 |  |  |  | Yes |  |  | 20 | 1 |
|  | 8 |  |  | Yes | Yes |  |  |  |  |
| CA_3A-20A | 3 |  |  | Yes | Yes | Yes | Yes | 30 | 0 |
|  | 20 |  |  | Yes | Yes |  |  |  |  |
| CA_4A-5A | 4 |  |  | Yes | Yes |  |  | 20 | 0 |
|  | 5 |  |  | Yes | Yes |  |  |  |  |
| CA_4A-7A | 4 |  |  | Yes | Yes |  |  | 30 | 0 |
|  | 7 |  |  | Yes | Yes | Yes | Yes |  |  |
| CA_4A-12A | 4 | Yes | Yes | Yes | Yes |  |  | 20 | 0 |
|  | 12 |  |  | Yes | Yes |  |  |  |  |
| CA_4A-13A | 4 |  |  | Yes | Yes | Yes | Yes | 30 | 0 |
|  | 13 |  |  |  | Yes |  |  |  |  |
|  | 4 |  |  | Yes | Yes |  |  | 20 | 1 |
|  | 13 |  |  |  | Yes |  |  |  |  |
| CA_4A-17A | 4 |  |  | Yes | Yes |  |  | 20 | 0 |
|  | 17 |  |  | Yes | Yes |  |  |  |  |
| CA_4A-29A | 4 |  |  | Yes | Yes |  |  |  |  |
|  | 29 |  | Yes | Yes | Yes |  |  |  |  |
| CA_5-12 | 5 |  |  | Yes | Yes |  |  |  |  |
|  | 12 |  |  | Yes | Yes |  |  |  |  |
| CA_5A-17A | 5 |  |  | Yes | Yes |  |  | 20 | 0 |
|  | 17 |  |  | Yes | Yes |  |  |  |  |
| CA_7A-20A | 7 |  |  | Yes | Yes | Yes |  | 30 | 0 |
|  | 20 |  |  | Yes | Yes |  |  |  |  |
| CA_8A-20A | 8 |  |  | Yes | Yes |  |  |  |  |
|  | 20 |  |  | Yes | Yes |  |  |  |  |
| CA_11A-18A | 11 |  |  | Yes | Yes |  |  |  |  |
|  | 18 |  |  | Yes | Yes | Yes |  |  |  |

In [Table 6], for example, the first CA Configuration, CA_1A-5A indicates that CCs of Operating Band 1 in [Table 3] and CA Bandwidth Class A in [Table 4] are aggregated with CCs of Operating Band 5 in [Table 3] and CA Bandwidth Class A in [Table 4].

Interference Cancellation Method

Figure 12:
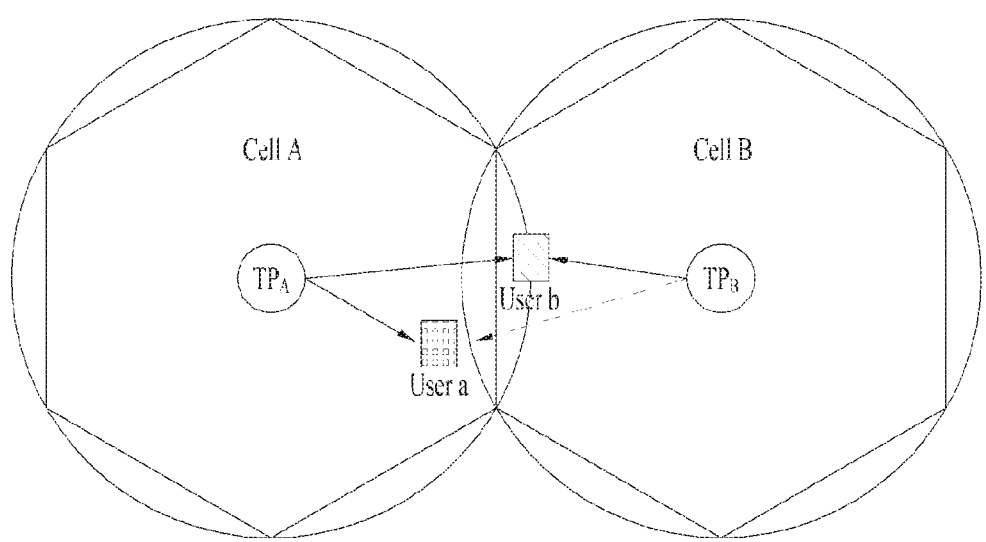
FIG. 12 illustrates a general interference environment in a downlink system.

FIG. 12 illustrates a general interference environment in a DL system.

For the convenience of description, a cell managed by TP A is referred to as cell A, and a user communicating with TP A is referred to as UE a. Likewise, cell B and UE b exist for an adjacent TP, TP B. Because cell A and cell B use the same radio resources, UE b located at a cell edge is interfered by cell A. Hereinafter, cell A is referred to as an interference cell, TP A is referred to as an interference TP, cell B is referred to as a serving cell, TP B is referred to as a serving TP, and UE b is referred to as a NAICS (Network-Assisted Interference Cancellation and Suppression) UE.

A NAICS UE is defined as a UE capable of increasing a data reception rate by cancelling an interference signal received from an interference cell.

In order to effectively cancel interference, the NAICS UE should have knowledge of various interference parameters (IPs) regarding the interference signal. For example, information about a control format indicator (CFI), a multimedia broadcast multicast service single frequency network (MB-SFN) configuration, an RI, a CRS AP, a cell ID, a modulation order, an MCS, an RNTI, a transmission mode (TM), and so on is required in a NAICS environment independent of TMs. In a CRS TM NAICS environment, information about a PMI, a data to RS EPRE, a PA, a PB, a system bandwidth, a PDSCH allocation, and so on is required. Also in a DM-RS TM NAICS environment, information about a PDSCH bandwidth for DM-RS, a data to RS EPRE, a PB, DMRS APs, nSCID, CSI-RS presence and their pattern, a virtual cell ID, and so on is required. Meanwhile, the serving cell may receive the IPs needed to perform NAICS from the adjacent cell through a backhaul or the like.

The NAICS UE cancels an interference signal by receiving the IPs through the serving TP or the interference TP or detecting the IPs by blind detection (BD). However, if all necessary IPs are received, signaling overhead and complexity may be increased significantly. Moreover, if BD is performed for some IPs, inaccurate values may be detected, thereby failing to cancel an interference signal successfully.

As a solution to the above problem, the values of some IPs may be restricted in advance through network coordination. That is, the UE may perform BD for a value of an IP only within a restricted set.

Embodiment 1

An embodiment of the present invention relates to a method for reporting a UE capability regarding an interference TM, and a method for implicitly indicating interference TM information to a UE using a UE capability by a BS.

It is ideal that a NAICS UE is capable of performing NAICS with respect to all interference TMs. Considering an actual UE complexity, however, many UEs have a NAICS capability only for a specific interference TM or a specific interference TM set. For example, a specific UE may perform NAICS by detecting IPs only for CRS-based interference TMs, TMs 2, 3, 4, 5, and 6 through BD, without the capability of performing NAICS for the other interference TMs. In other words, the interference TMs that the UE supports are TMs 2, 3, 4, 5, and 6. Other UEs may be able to perform NAICS only for DMRS-based interference TMs, TMs 8, 9, and 10.

One of methods for enabling a UE to efficiently perform NAICS is that a TM set used by an interference cell is restricted and indicated to the UE. For example, if the interference cell uses only TMs 2 and 3, information about the TMs 2 and 3 is indicated to the UE, and the UE may determine whether to perform NAICS by comparing its NAICS capability with the interference TMs. However, this method requires additional signaling to indicate an interference TM.

In Embodiment 1, methods for implicitly indicating to a UE whether a TM of an interference cell is included in TMs supported by the UE, without additional signaling regarding information about the TM of the interference cell will be described.

Embodiment 1-1

Embodiment 1-1 of the present invention relates to a method for transmitting information about supported TMs by a UE and transmitting network assistance information only to a UE that will perform NAICS based on the information by a BS. Thus, the UE may implicitly determine whether a TM of an interference cell is included in the supported TMs of the UE. A detailed description will be given below of Embodiment 1-1.

If different UEs support different interference TMs, it is preferable for the UEs to report their NAICS capability information including information about supported interference TMs of the UEs to the BS.

The BS determines whether a specific UE will perform NAICS based on received information about supported interference TMs of the UE, and transmits network assistance information only to a UE that will perform NAICS.

That is, upon receipt of the network assistance information, a UE may be implicitly aware that a TM of an interference cell is included in supported TMs of the UE.

For example, it is assumed that UE1 and UE2 experiencing severe interference from interference cell A exist in a serving cell, and report TMs 2, 3, 4, 5, and 6, and TMs 8, 9, and 10, respectively as their supported interference TMs. If only LTE release-8 UEs exist in interference cell A and thus interference cell A uses only CRS-based TMs (TM 2, 3, 4, 5, and 6), UE2 does not perform NAICS successfully. Therefore, the serving cell transmits network assistance information about interference cell A only to UE1 so that only UE1 may perform NAICS. In other words, the serving cell does not transmit the network assistance information to UE2, thereby not allowing UE2 to perform NAICS.

In other words, if a UE has not received the network assistance information, the UE does not perform NAICS, assuming that a TM of the interference BS is not included in supported interference TMs of the UE. On the other hand, if the UE has received the network assistance information, the UE performs NAICS, assuming that the TM of the interfering BS is included in the supported interference TMs of the UE.

In Embodiment 1-1, the LTE release-8 UEs may move out of interference cell A and LTE release-11 UEs may enter interference cell A, with passage of time. In this case, as the TM of the interference cell is changed, UE2 may receive network assistance information and thus perform NAICS. On the other hand, having received the network assistance information at the time when cell A includes only the release-8 UEs, UE1 may not perform NAICS any longer. Therefore, it is preferable to indicate to UE1 that the previous network assistance information received by UE1 is not valid any longer, by RRC signaling. Upon receipt of this information, UE1 may not perform NAICS. Or a valid duration may be set for the transmitted (e.g., RRC-signaled) network assistance information. If the network assistance information is not updated within the valid duration, the UE may determine that the previously received network assistance information is not valid.

In another method regarding a TM of an interference cell, a UE may perform NAICS on the assumption that its TM is always identical to an interference TM. To support this method, a BS may configure a specific frequency resource area to which the same TM is to be applied through cooperation between BSs through a backhaul, and perform UE scheduling according to the configured value. In this case, although the BS has limitations in resource allocation, signaling overhead is advantageously reduced.

Also, when the UE receives TM information about the interference cell, the BD performance of IPs may be changed according to an interference TM set. For example, high-accuracy BD may be possible for TM set A, whereas the accuracy of BD may be decreased for TM set B. Accordingly, it may be restricted that resource allocation (RA) granularities of interference PDSCHs are different for TM set A and TM set B. For example, BD performance may be increased by allowing PRB-wise scheduling for Set A without any special restriction on the RA of the interference cell, and restricting scheduling on an RBG basis, PRG basis, or subband basis for Set B.

While the UE reports supported interference TM information on a set basis in the above description, this is purely exemplary. If the UE supports only one interference TM, the UE may report only one value. For example, if the UE is able to eliminate only a TM-4 interference PDSCH, the UE reports only TM 4 as a supported interference TM.

In addition, the UE may report its supported interference TM and its desired PDSCH TM at the moment in a pair. For example, only when its desired PDSCH TM satisfies a specific condition, the UE may perform NAICS for TM-9 interference. The specific condition may be, for example, DMRS-based TMs (TMs 8, 9, and 10).

Additionally, the UE may report, as a capability, whether it is capable of performing NAICS only when its TM is identical to an interference TM to be cancelled or even when the two TMs are different (in the case of a mixed TM).

The NAICS UE capability information may include information about the number of NAICS-possible CRS ports of an interference cell as well as a supported interference TM. For example, a UE computation capability may be considered. Thus, a UE having a low computation capability may report that it is capable of performing NAICS only for one and two CRS ports of an interference cell, and a UE having a high computation capability may report that it is capable of performing NAICS for one, two, and four CRS ports of an interference cell.

Also in a specific example, the UE may transmit a variable n indicating the number of NAICS-possible CRS ports of an interference cell in UE capability information. In another example, the UE may transmit a specific field (supportedNAICS-2CRS-AP) indicating that a NAICS operation is possible for two CRS antenna ports in UE capability information. If the specific field is included in the UE capability information, it may be determined that the number of CRS ports in the interference cell is 2.

Embodiment 1-2

Embodiment 1-2 relates to a method for implicitly signaling information about a TM of an adjacent cell by transmitting MBSFN subframe information about the adjacent cell to a NAICS UE (by higher-layer signaling). For example, the UE may assume that the interference cell transmits a signal in a subframe indicated as an MBSFN subframe in a DM-RS-based TM and in a subframe not indicated as an MBSFN subframe in a CRS-based TM. Hereinbelow, Embodiment 1-2 will be described in detail.

LTE Release-12 considers a technique for supporting different TM sets for different subframe sets due to the TM detection capabilities of NAICS UEs. In the LTE system, TMs are classified largely into CRS-based TMs and DM-RS-based TMs. Accordingly, a method for distinguishing the two types of TMs from each other on a subframe set basis may be used.

It is preferable not to transmit CRSs in a PDSCH region in a subframe set for which a DM-RS-based TM is allowed because a CRS-based TM does not exist in the subframe set. This may be supported by MBSFN subframe-based unicast transmission introduced to LTE Release-9.

Therefore, TMs of an adjacent cell may be classified into CRS-based TMs and DM-RS-based TMs, and different subframe sets may be matched to the two types of TMs. In this manner, information about subframe sets may provide interference TM information implicitly.

For example, if a NAICS UE receives MBSFN subframe information about an adjacent cell which is a target for NAICS, the NAICS UE assumes that a DM-RS-based TM is applied to an MBSFN subframe of the adjacent cell and a CRS-based TM is applied to a non-MBSFN subframe of the adjacent cell.

Embodiment 1-3

Embodiment 1-3 of the present invention relates to a method for implicitly signaling interference TM information to a UE, using a triggering subframe set by a BS.

If a TM is restricted on a subframe set basis for an adjacent cell, too a strict constraint may be imposed on scheduling of the adjacent cell.

Therefore, a serving cell indicates triggering subframe set information indicating that a CRS-based TM or a DM-RS-based TM starts in an adjacent cell to a NAICS UE (by higher-layer signaling). For example, the BS indicates the period and offset of a triggering subframe to the NAICS UE. The NAICS UE may determine a TM of the adjacent cell used until the next period by detecting DM-RSs in a triggering subframe.

Figure 13:
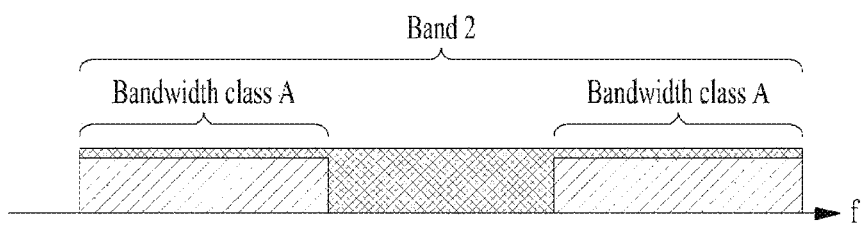
FIG. 13 illustrates an exemplary transmission mode (TM) of an adjacent cell according to triggering subframe set information.

FIG. 13 illustrates an exemplary TM of an adjacent cell according to triggering subframe set information.

Referring to FIG. 13, the adjacent cell manages a triggering subframe set with a predetermined periodicity of T. if a DM-RS is detected at time k, this means that a DM-RS-based TM is applied during a time period of T corresponding to time k. Subsequently, if a DM-RS is not detected at time k+1 in the next period, a CRS-based TM is assumed for a corresponding time period of T.

That is, the NAICS UE searches for a DM-RS using a VCID of the adjacent cell at each time instant of a specific subframe set. Upon detection of a DM-RS, the NAICS UE assumes a DM-RS-based TM for a time period of T, and otherwise, the NAICS UE assumes a CRS-based TM for the time period of T.

To enable the NAICS UE to easily determine a TM by DM-RS detection, the adjacent cell preferably performs DM-RS-based scheduling or DM-RS+dummy signal transmission in a corresponding subframe.

According to Embodiment 1-3, the scheduling constraint imposed on the adjacent cell may be relieved to within a time unit of T.

Further, if Embodiment 1-3 of the present invention is applied, the triggering subframe set may be configured as an MBSFN subframe set. As described in Embodiment 1-2 of the present invention, no CRS is detected in a subframe set for which a DM-RS-based TM is allowed and this may be supported by MBSFN subframe-based unicast. That is, the NAICS UE determines a TM by attempting DM-RS detection at each time instant of the triggering subframe set, and does not perform additional detection of a CRS-based TM and a NAICS operation. This is because TM decision in the triggering subframe set leads to determination of a subsequent time period of T and thus detection accuracy should be high. Therefore, interference is relieved by restricting signal transmission in a CRS-based TM in the triggering subframe set, thereby increasing DM-RS detection accuracy.

Further, when Embodiment 1-3 of the present invention is applied, the adjacent cell may be configured to transmit a dummy CSI-RS for which an initial value of a sequence, VCID is variable, and a different TM set may be meant for each VCID.

In Embodiment 1-3 of the present invention, if a TM is determined by DM-RS detection in the first subframe of each time period of T, detection accuracy may be decreased due to interference between DM-RSs of a plurality of antenna ports of the adjacent cell. Thus, the adjacent cell may be configured to transmit a dummy CSI-RS for which an initial value of a sequence, VCID is variable, and a different TM set may be meant for each VCID.

However, UEs serviced by the adjacent cell cannot use dummy CSI-RSs because the VCID is changed, and the adjacent cell should set ZP CSI-RSs at positions of a CSI-RS pattern corresponding to the dummy CSI-RSs.

The NAICS UE detects dummy CSI-RSs in a triggering subframe set and determines information about TMs supported during the next time period of T according to the VCID of the detected CSI-RSs. In addition, the mapping relationship between a VCID and a TM set may be set to be different for each frequency resource unit and indicated to the NAICS UE. The NAICS UE may detect the VCID of a dummy CSI-RS on a frequency resource unit, thereby determining TM information about the corresponding frequency resources.

Embodiment 2

Embodiment 2 of the present invention proposes a method for reporting a NAICS capability to a BS in specific consideration of a CA capability by a UE having both the CA capability and the NAICS capability.

In addition, it is obvious that the technical feature of reporting a NAICS capability per band per band combination or per bandwidth per band per band combination is applicable to a higher level, that is, per band combination.

According to Embodiment 2 of the present invention, a UE may report a NAICS capability independently for each CC which may be aggregated. As a consequence, the UE may be implemented more flexibly. For example, a UE having low processing power may report that it is capable of performing NAICS only for one of two CCs that can be aggregated, and a UE having high processing power may report that it is capable of performing NAICS for the two CCs.

First, an exemplary specific method for reporting a NAICS capability per band per band combination is illustrated in [Table 7], [Table 8] and [Table 9].

Referring to [Table 7], a NAICSsupported-r12 is added to BandParameters-v12 defined in BandCombinationParameters-v12, so that the UE may report a NAICS capability for a corresponding band by turning on/off a NAICS function. That is, the NAICSsupported-r12 field for each band may indicate whether the UE supports NAICS in the band.

TABLE 7

```
UE-EUTRA-Capability-v12-IEs ::= SEQUENCE {
pdcp-Parameters-v12   PDCP-Parameters-v12,
phyLayerParameters-v12   PhyLayerParameters-v12   OPTIONAL,
rf-Parameters-v12   RF-Parameters-v12,
measParameters-v12   MeasParameters-v12,
interRAT-ParametersCDMA2000-v12   IRAT-ParametersCDMA2000-v12,
otherParameters-r12   Other-Parameters-r12,
fdd-Add-UE-EUTRA-Capabilities-v12        UE-EUTRA-CapabilityAddXDD-Mode-v12
OPTIONAL,
tdd-Add-UE-EUTRA-Capabilities-v12        UE-EUTRA-CapabilityAddXDD-Mode-v12
OPTIONAL,
nonCriticalExtension   SEQUENCE { }   OPTIONAL
}
RF-Parameters-v12 ::= SEQUENCE {
supportedBandCombination-v12   SupportedBandCombination-v12   OPTIONAL
}
SupportedBandCombination-v12 ::= SEQUENCE (SIZE (1..maxBandComb-r10)) OF
BandCombinationParameters-v12
BandCombinationParameters-v12 ::= SEQUENCE {
multipleTimingAdvance-r12 ENUMERATED {supported}   OPTIONAL,
simultaneousRx-Tx-r12   ENUMERATED {supported}   OPTIONAL,
bandParameterList-r12   SEQUENCE (SIZE (1..maxSimultaneousBands-r10)) OF
BandParameters-v12 OPTIONAL,
...
}
BandParameters-v12 ::= SEQUENCE {
supportedCSI-Proc-r12   ENUMERATED {n1, n3, n4}
NAICSsupported-r12   BOOLEAN
}
```

For example, the UE may report whether it can support NAICS or report a maximum number of NAICS-supportable CCs, per band per band combination. In the case of band combination of CA_1A-5A in the example of [Table 6], the UE may report whether NAICS is supported for each CC of the included bands 1A and 5A and the maximum number of supported CCs.

Or more elaborately, the UE may report a NAICS capability independently per bandwidth per band per band combination.

For example, the UE may report whether NAICS is supported or the maximum number of CCs for which NAICS is supported, per bandwidth per band per band combination.

In another method, if the NAICS function is on, the UE may report a specific NAICS capability additionally. For example, BandParameters may be defined as illustrated in [Table 8] below.

TABLE 8

```
BandParameters-v12 ::= SEQUENCE {
supportedCSI-Proc-r12     ENUMERATED {n1, n3, n4}
supportedNAICS-Capability-r12 NAICS-Capability-r12   OPTIONAL
}
```

In [Table 8], NAICS-capability-r12 is a field indicating the NAICS capability of the UE, which may specify a NAICS receiver type, a supported interference TM, the number of supported interference CRS ports, and so on.

The NAICS receiver type may indicate a type such as SLIC, R-ML, ML, or Enhanced MMSE IRC receiver. The supported interference TM refers to TM information about an interference signal for which the UE is capable of performing NAICS, as described before. The number of supported interference CRS ports, n means that the UE is capable of performing NAICS for an interference cell transmitting n-port CRSs. That is, if n=1 or 2, the UE is capable of performing NAICS for an interference cell transmitting 1- or 2-port CRSs, and if n=1, 2, or 4, the UE is capable of performing NAICS for an interference cell transmitting 1-, 2-, or 4-port CRSs.

If NAICS-capability-r12 is not reported for a band, this implies that the NAICS function is off for the band.

Also, the UE may report the maximum number of NAICS-supported CCs in a specific band, per band per band combination. For example, RRC signaling may be defined as described in [Table 9]. That is, the NAICSsupported-r12 field for each band indicates the maximum number of CCS that the UE supports in the band.

TABLE 9

BandParameters-v12 ::= SEQUENCE {
supportedCSI-Proc-r12   ENUMERATED {n1, n3, n4}
  NAICSsupported-r12   ENUMERATED {n0, n1, n2, n3, ...}
}

If the signaling as described in [Table 9] is used, a NAICS capability may be reported more elaborately for a CC of contiguous intra-band CA. For example, if contiguous intra-band CA is performed in band 1 using Bandwidth Class C, it is possible to support NAICS only for one of two CCs of band 1. That is, if the UE sets NAICSsupported-r12 for band 1C to 1, the UE indicates to the BS that it supports NAICS only for one of the two CCs of band 1.

Further from the method, the UE should be able to report a NAICS capability independently for each CC of intra-band non-contiguous CA. For example, the UE should be able to report a NAICS capability independently for intra-band CA with (2A, 2A), as illustrated in FIG. 14.

For this purpose, as the UE reports a MIMO capability independently per bandwidth per band per band combination, the UE should be able to report a NAICS capability independently per bandwidth per band per band combination.

Figure 14:
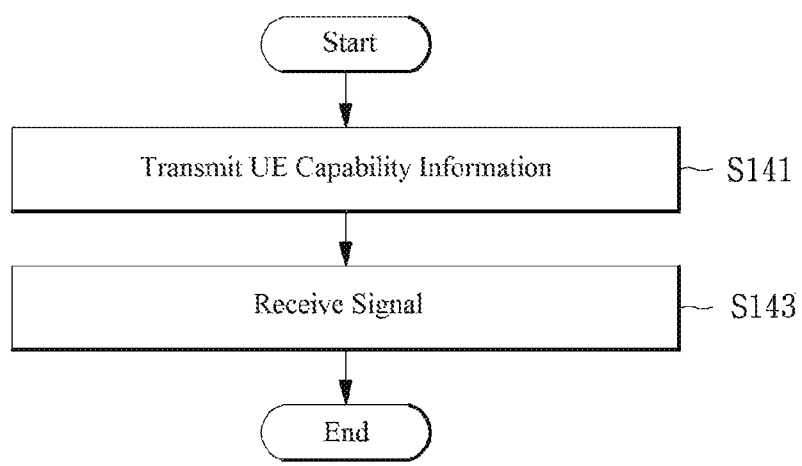
FIG. 14 is a flowchart illustrating an embodiment of the present invention.

That is, the UE preferably reports a NAICS capability independently for the left CC and the right CC in FIG. 14.

Therefore, [Table 7], [Table 8], and [Table 9] describing NAICS capability reporting per band per band combination may be extended respectively to [Table 10], [Table 11], and [Table 12] describing NAICS capability reporting per bandwidth per band per band combination.

[Table 10] below corresponds to [Table 7], describing reporting whether a NAICS capability is supported per bandwidth per band per band combination.

TABLE 10

BandParametersDL-v12::=SEQUENCE (SIZE
(1..maxBandwidthClass-r12))  OF  CA-NAICS-ParametersDL-r12
CA-NAICS-ParametersDL-r12 ::= SEQUENCE {
    ca-BandwidthClassDL-r12   CA-BandwidthClass-r12,
    NAICSsupported-r12        BOOLEAN
}

[Table 11] below corresponds to [Table 8], describing further reporting of a specific NAICS capability per bandwidth per band per band combination in the case where the NAICS function is on.

TABLE 11

BandParametersDL-v12::=SEQUENCE (SIZE
(1..maxBandwidthClass-r12))  OF  CA-NAICS-ParametersDL-r12
CA-NAICS-ParametersDL-r12 ::= SEQUENCE {
ca-BandwidthClassDL-r12   CA-BandwidthClass-r12,
supportedNAICS-Capability-r12    NAICS-Capability-r12
    OPTIONAL
}

[Table 12] below corresponds to [Table 9], describing reporting the maximum number of CCs supporting the NAICS function, per bandwidth per band per band combination.

TABLE 12

BandParametersDL-v12::=SEQUENCE (SIZE
(1..maxBandwidthClass-r12))  OF  CA-NAICS-ParametersDL-r12
CA-NAICS-ParametersDL-r12 ::= SEQUENCE {
    ca-BandwidthClassDL-r12    CA-BandwidthClass-r12,
    NAICSsupported-r12         ENUMERATED {n0, n1, n2, n3, ...}
}

As described before, the feature of reporting a NAICS capability per band per band combination in [Table 7], [Table 8], and [Table 9] is also applicable to reporting a NAICS capability at a higher level, that is, per band combination. For example, a parameter for reporting a NAICS capability may be included in a BandCombination parameter in [Table 7], [Table 8], and [Table 9].

Meanwhile, different MIMO capabilities may be defined depending on whether NAICS is performed or not.

If the UE performs NAICS, the UE uses a part of total spatial resources achievable with the number of its reception antennas in receiving an interference signal. As a result, only a part of the total spatial resources are used in receiving desired data. That is, a MIMO capability depends on the maximum number of layers in which desired data is spatially multiplexed.

On the contrary, if the UE does not perform NAICS, all of the total spatial resources may be used for reception of the desired data, thereby increasing the MIMO capability.

For example, a NAICS UE with four reception antennas may report two MIMO capabilities corresponding to NAICS and non-NAICS. That is, the UE may report maximum 2 layer spatial division multiplexing (SDM) as a MIMO capability in the case where the NAICS function is on, and maximum 4 layer SDM as a MIMO capability in the case where the NAICS function is off.

Further, the NAICS UE may just report the number of CCs for which NAICS is possible in a different manner from in the examples of [Table 7], [Table 8], and [Table 9] in which whether NAICS is possible or the number of NAICS-possible CCs is reported per band per band combination.

That is, if the number of NAICS-possible CCs is N, the BS transmits a necessary network assistance signal for each of the N CCs to the UE. If the number of NAICS-possible CCs is 0, this implies that the UE cannot perform NAICS for any CC.

For example, signaling may be defined as described in [Table 13]. In [Table 13], NAICSsupported-r12 indicates the maximum number of CCs that the NAICS UE is capable of supporting.

TABLE 13

```
UE-EUTRA-Capability-v12-IEs ::= SEQUENCE {
pdcp-Parameters-v12   PDCP-Parameters-v12,
phyLayerParameters-v12   PhyLayerParameters-v12   OPTIONAL,
rf-Parameters-v12   RF-Parameters-v12,
measParameters-v12   MeasParameters-v12,
interRAT-ParametersCDMA2000-v12 IRAT-ParametersCDMA2000-v12,
otherParameters-r12   Other-Parameters-r12,
fdd-Add-UE-EUTRA-Capabilities-v12        UE-EUTRA-CapabilityAddXDD-Mode-v12
OPTIONAL,
tdd-Add-UE-EUTRA-Capabilities-v12        UE-EUTRA-CapabilityAddXDD-Mode-v12
OPTIONAL,
nonCriticalExtension   SEQUENCE { }     OPTIONAL
}
RF-Parameters-v12 ::=   SEQUENCE {
NAICSsupported-r12   ENUMERATED {n0, n1, n2, n3, ...}
}
```

In the scheme illustrated in [Table 13], if the UE reports n0, the UE does not perform NAICS irrespective of whether it actually performs CA.

Further, if a CA-enabled UE receives a DL service in one CC without actual CA implementation, the UE may perform NAICS using the resulting extra processing power.

Specifically, for example, if a CA-enabled UE performs CA for four or fewer CCs out of five CCs, the UE has more extra processing power because the number of used CCs is decreased. The UE may perform NAICS for more CCs using the extra processing power. For example, if four CCs are aggregated, the UE may perform NAICS for one CC. If two CCs are aggregated, the UE may perform NAICS for the two CCs. In this context, it is preferred to report the maximum number of NAICS-possible CCs for each number of actual aggregated CCs, for effective NAICS capability reporting.

In another method, the UE may independently report the maximum number of NAICS-possible CCs in the case of CA and whether NAICS is possible in the case of non-CA.

Additionally, the UE may report the maximum number of layers to which NAICS will be applied per band per band combination to the BS. The number of layers is the sum of the number of layers of a desired PDSCH and the number of layers of an interference PDSCH. For example, in the case where the maximum number of layers is 3, if the number of desired PDSCH layers is 1, up to two interference PDSCH layers may be canceled, and if the number of desired PDSCH layers is 2, up to one interference PDSCH layer may be cancelled.

For example, RRC signaling as described in [Table 14] may be used. In [Table 14], NAICSsupported-r12 indicates the maximum number of layers in a corresponding band, to which the NAICS UE will apply NAICS.

TABLE 14

```
BandParameters-v12 ::= SEQUENCE {
    supportedCSI-Proc-r12   ENUMERATED {n1, n3, n4}
    NAICSsupported-r12      ENUMERATED {n1, n2, n3, ...}
}
```

Likewise, the UE may report the maximum number of layers to which NAICS will be applied, per bandwidth per band per band combination, to the BS by extending the contents of [Table 14].

For example, RRC signaling as described in [Table 15] may be used.

TABLE 15

```
BandParametersDL-v12::=SEQUENCE  (SIZE
(1..maxBandwidthClass-r12))   OF   CA-NAICS-ParametersDL-r12
CA-NAICS-ParametersDL-r12 ::= SEQUENCE {
ca-BandwidthClassDL-r12      CA-BandwidthClass-r12,
    NAICSsupported-r12       ENUMERATED {n1, n2, n3, ...}
}
```

In the above example, the number of layers to which NAICS is to be applied is the sum of the number of desired PDSCH layers and the number of interference PDSCH layers to be cancelled. In another method, the number of layers may be defined as the maximum number of interference PDSCH layers to be cancelled. In this case, 0 may be included as an available value of ENUMERATED of NAICSsupported-r12 in [Table 14] and [Table 15].

Further, although only the number of layers to which NAICS is to be applied is expressed in [Table 14] and [Table 15], the number of NAICS-supportable CCs as well as the number of layers may be included by combining [Table 14] and [Table 15] with [Table 9] and [Table 12]. It is also obvious that the signaling may be combined with the signaling of another example, for reporting.

Although the number of layers is reported per band per band combination or per bandwidth per band per band combination, it may be reported more accurately per CC.

In another reporting method, the UE may indicate whether it is NAICS-capable or not by a 1-bit indicator. If CA is applied, the UE and the BS may interpret the 1-bit indicator as follows.

If the NAICS capability indicator is 1, the UE may apply NAICS to at least one CC. The BS is not aware of the number of CCs for which the UE will actually perform NAICS and signals NAICS information about every CC in case NAICS is performed for all CCs. The UE finally determines the number of CCs for which NAICS will be performed, and performs NAICS using NAICS information about a corresponding CC. If the NAICS capability indicator is 0, the UE may not apply NAICS to any CC.

Or the NAICS capability indicator may be interpreted as follows.

If the NAICS capability indicator is 1, the UE may apply NAICS to at least one CC. The BS is not aware of the number of CCs for which the UE will actually perform NAICS, selects a part of CCs to which NAICS will be applied, and signals NAICS information in the corresponding CCs. The UE finally determines the number of CCs for which NAICS will be performed, and performs NAICS using NAICS information about a corresponding CC. If the NAICS capability indicator is 0, the UE may not apply NAICS to any CC.

The 1-bit indicator is NAICSsupported-r12 which may be defined as described in [Table 16].

TABLE 16

```
UE-EUTRA-Capability-v12-IEs ::= SEQUENCE {
  pdcp-Parameters-v12    PDCP-Parameters-v12,
  phyLayerParameters-v12    PhyLayerParameters-v12    OPTIONAL,
  rf-Parameters-v12    RF-Parameters-v12,
  naics-Capability-v12    NAICS-Capability-v12
  measParameters-v12    MeasParameters-v12,
  interRAT-ParametersCDMA2000-v12    IRAT-ParametersCDMA2000-v12,
  otherParameters-r12    Other-Parameters-r12,
    fdd-Add-UE-EUTRA-Capabilities-v12    UE-EUTRA-CapabilityAddXDD-Mode-v12    OPTIONAL,
    tdd-Add-UE-EUTRA-Capabilities-v12    UE-EUTRA-CapabilityAddXDD-Mode-v12    OPTIONAL,
    nonCriticalExtension    SEQUENCE{ }    OPTIONAL
}
NAICS-Capability-v12::=    SEQUENCE {
NAICSsupported-r12 BOOLEAN
}
```

In another reporting method, the UE may indicate whether it is NAICS-capable per band combination by a 1-bit indicator. If CA is applied, the UE and the BS may interpret the 1-bit indicator as follows.

If the NAICS capability indicator is 1, the UE may apply NAICS to at least one CC of a corresponding band combination. The BS is not aware of the number of CCs for which the UE will actually perform NAICS and signals NAICS information about every CC of a corresponding band combination in case NAICS is performed for all CCs of the band combination. The UE finally determines the number of CCs for which NAICS will be performed in the band combination, and performs NAICS using NAICS information about a corresponding CC. If the NAICS capability indicator is 0, the UE may not apply NAICS to any CC of the band combination.

Or the 1-bit indicator may be interpreted as follows.

If the NAICS capability indicator is 1, the UE may apply NAICS to at least one CC of a corresponding band combination. The BS is not aware of the number of CCs for which the UE will actually perform NAICS, selects a part of CCs to which NAICS will be applied from among all CCs of the band combination, and signals NAICS information. The UE finally determines the number of CCs for which NAICS will be performed in the band combination, and performs NAICS using NAICS information about a corresponding CC. If the NAICS capability indicator is 0, the UE may not apply NAICS to any CC of the band combination.

The 1-bit indicator is NAICSsupported-r12 which may be defined as described in [Table 17].

TABLE 17

```
UE-EUTRA-Capability-v12-IEs ::= SEQUENCE {
    pdcp-Parameters-v12    PDCP-Parameters-v12,
    phyLayerParameters-v12    PhyLayerParameters-v12    OPTIONAL,
    rf-Parameters-v12    RF-Parameters-v12,
    measParameters-v12    MeasParameters-v12,
    interRAT-ParametersCDMA2000-v12    IRAT-ParametersCDMA2000-v12,
  otherParameters-r12    Other-Parameters-r12,
    fdd-Add-UE-EUTRA-Capabilities-v12    UE-EUTRA-CapabilityAddXDD-Mode-v12    OPTIONAL,
    tdd-Add-UE-EUTRA-Capabilities-v12    UE-EUTRA-CapabilityAddXDD-Mode-v12    OPTIONAL,
    nonCriticalExtension    SEQUENCE { }    OPTIONAL
}
SupportedBandCombination-v12::=SEQUENCE(SIZE(1..maxBandComb-r10)) OF
BandCombinationParameters-v12
BandCombinationParameters-v12 ::= SEQUENCE {
    NAICSsupported-r12    BOOLEAN
    multipleTimingAdvance-r12    ENUMERATED {supported}    OPTIONAL,
    simultaneousRx-Tx-r12    ENUMERATED {supported}    OPTIONAL,
    bandParameterList-r12    SEQUENCE (SIZE (1..maxSimultaneousBands-r10)) OF
BandParameters-v12 OPTIONAL,
    ...
}
```

In another method, the UE indicates whether NAICS is possible by a 1-bit indicator. If CA is applied, both the UE and the BS interpret that NAICS is not possible irrespective of the 1-bit indicator.

In another reporting method, the UE reports a bandwidth (BW) for which NAICS is possible as well as whether NAICS is possible. That is, the UE may report NAICS-supportable aggregated BW.

For example, if the UE reports that it is NAICS-capable for 20 MHz, the BS configures CCs so that the sum of BWs may become 20 MHz or less, and transmits NAICS information corresponding to the CCs to the UE. Or a NAICS-possible BW may be reported per PRB.

A NAICS-possible total BW may be reported per band combination, per band per band combination, or per bandwidth per band per band combination.

The NAICS-possible total BW may be reported together with the maximum number of NAICS-possible CCs. For example, a UE capability may be reported in a supported-NAICS field configured as an 8-bit bitmap, and each bit of the supportedNAICS field may indicate a predetermined combination of a NAICS-possible total BW and the maximum number of NAICS-possible CCs. In a specific example, the first bit of supportedNAICS may indicate 50 PRBs and 5 respectively as a NAICS-possible total BW and the maximum number of NAICS-possible CCs. If the first bit is 1, it may indicate that there is a corresponding NAICS capability.

FIG. 14 is a flowchart illustrating an embodiment of the present invention.

Referring to FIG. 14, a UE first transmits UE capability information indicating a NAICS capability supported by the UE (S141). The UE capability information transmitted by the UE may include a plurality of parameters which have been described in Embodiment 1 or Embodiment 2 of the present invention. The parameters included in the UE capability information have been described in detail in Embodiment 1 or Embodiment 2 and thus will not be described in detail herein.

Subsequently, the UE receives a signal from a BS based on the UE capability information (S413). Also, the UE may receive a signal using received network assistance information corresponding to the transmitted UE capability information.

Figure 15:
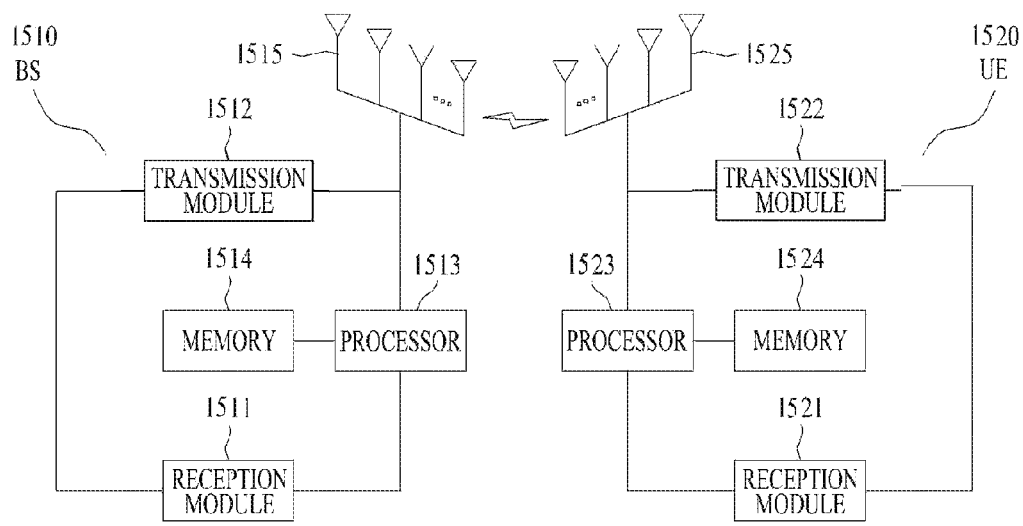
FIG. 15 is a block diagram of a base station (BS) and a user equipment (UE) to which an embodiment of the present invention is applicable.

FIG. 15 is a diagram for a BS and a UE capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 15, a wireless communication system includes a base station (BS) 1510 and a user equipment (UE) 1520. The BS 1510 includes a processor 1513, a memory 1514 and a radio frequency (RF) unit 1511/1512. The processor 1513 can be configured to implement the proposed functions, processes and/or methods. The memory 1514 is connected with the processor 1513 and then stores various kinds of information associated with an operation of the processor 1513. The RF unit 1516 is connected with the processor 1513 and transmits and/or receives a radio signal. The user equipment 1520 includes a processor 1523, a memory 1524 and a radio frequency (RF) unit 1521/1522. The processor 1523 can be configured to implement the proposed functions, processes and/or methods. The memory 1524 is connected with the processor 1523 and then stores various kinds of information associated with an operation of the processor 1523. The RF unit 1521/1522 is connected with the processor 1523 and transmits and/or receives a radio signal. The base station 1510 and/or the user equipment 1520 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

The invention claimed is:

1. A method for receiving a signal using NAICS (Network-Assisted Interference Cancellation and Suppression) by a user equipment (UE) in a wireless communication system supporting a carrier aggregation, the method comprising:

transmitting UE capability information including band combination information indicating a band combination supported by the UE on the carrier aggregation; and receiving the signal using the NAICS based on the UE capability information, wherein the band combination information includes indication information indicating whether the UE supports the NAICS for the band combination.

2. The method according to claim 1, wherein if the indication information is included in the band combination information, it is indicated that the UE supports NAICS.

3. The method according to claim 1, wherein the indication information includes a maximum number of component carriers (CCs) supporting NAICS in the band combination corresponding to the band combination information.

4. The method according to claim 1, wherein the indication information includes a maximum bandwidth supporting NAICS for the band combination corresponding to the band combination information.

5. The method according to claim 1, wherein the indication information is configured in a bitmap, and each bit of the bitmap corresponds to a combination of a maximum number of component carriers (CCs) and a maximum bandwidth.

6. The method according to claim 1, wherein if the indication information is included in the band combination information, the number of common reference signal (CRS) ports in an interference cell is determined to be 2.

7. A user equipment (UE) for receiving a signal using NAICS (Network-Assisted Interference Cancellation and Suppression) in a wireless communication system supporting a carrier aggregation, the UE comprising:

a radio frequency (RF) unit; and a processor, wherein the processor transmits UE capability information including band combination information indicating a band combination supported by the UE on the carrier aggregation, and receives the signal using the NAICS based on the UE capability information, and wherein the band combination information includes indication information indicating whether the UE supports the NAICS for the band combination.

8. The UE according to claim 7, wherein if the indication information is included in the band combination information, it is indicated that the UE supports NAICS.

9. The UE according to claim 7, wherein the indication information includes a maximum number of component carriers (CCs) supporting NAICS in the band combination corresponding to the band combination information.

10. The UE according to claim 7, wherein the indication information includes a maximum bandwidth supporting NAICS for the band combination corresponding to the band combination information.

11. The UE according to claim 7, wherein the indication information is configured in a bitmap, and each bit of the bitmap corresponds to a combination of a maximum number of component carriers (CCs) and a maximum bandwidth.

12. The UE according to claim 7, wherein if the indication information is included in the band combination information, the number of common reference signal (CRS) ports in an interference cell is determined to be 2.

* * * * *